(12) United States Patent
Kim (10) Patent No.: US 12,137,496 B1
(45) Date of Patent: Nov. 5, 2024

(54) METHOD AND APPARATUS FOR PERFORMING UPLINK POSITIONING IN MOBILE WIRELESS COMMUNICATION SYSTEM

(71) Applicants: BLACKPIN INC., Seoul (KR); Soenghun Kim, Gyeonggi-do (KR)

(72) Inventor: Soenghun Kim, Gyeonggi-do (KR)

( * ) Notice: Subject to any disclaimer, the term of this patent is extended or adjusted under 35 U.S.C. 154(b) by 0 days.

(21) Appl. No.: 18/747,535

(22) Filed: Jun. 19, 2024

(30) Foreign Application Priority Data

Jul. 13, 2023 (KR) .................. 10-2023-0090954

(51) Int. Cl.
*H04W 76/27* (2018.01)
*H04L 5/00* (2006.01)

(52) U.S. Cl.
CPC ........... *H04W 76/27* (2018.02); *H04L 5/0048* (2013.01)

(58) Field of Classification Search
CPC ............................ H04W 76/27; H04L 5/0048
See application file for complete search history.

(56) References Cited

U.S. PATENT DOCUMENTS

| | | | |
|---|---|---|---|
| 2022/0030544 A1* | 1/2022 | Zhou | H04W 74/0833 |
| 2022/0312417 A1* | 9/2022 | Venkata | H04L 5/0098 |
| 2024/0267822 A1* | 8/2024 | Pan | H04W 36/322 |

OTHER PUBLICATIONS

3GPP, 3rd Generation Partnership Project; Technical Specification Group Radio Access Network; NR; Radio Resource Control (RRC) protocol specification (Release 17), Jun. 2023, pp. 1-1328, 3GPP TS 38.331 V17.5.0, http://www.3gpp.org.
3GPP, 3rd Generation Partnership Project; Technical Specification Group Radio Access Network; NR; Medium Access Control (MAC) protocol specification (Release 17), Jun. 2023, pp. 1-253, 3GPP TS 38.321 V17.5.0, http://www.3gpp.org.
3GPP, 3rd Generation Partnership Project; Technical Specification Group Radio Access Network; NR; Physical layer procedures for control (Release 17), Jun. 2023, pp. 1-262, 3GPP TS 38.213 V17.6.0, http://www.3gpp.org.
3GPP, 3rd Generation Partnership Project; Technical Specification Group Radio Access Network; NR; Physical layer procedures for data (Release 17), Mar. 2023, pp. 1-231, 3GPP TS 38.214 V17.5.0, http://www.3gpp.org.
3GPP, 3rd Generation Partnership Project; Technical Specification Group Radio Access Network; NR; Multiplexing and channel coding (Release 17), Mar. 2023, pp. 1-203, 3GPP TS 38.331 V17.5.0, http://www.3gpp.org.
3GPP, "Report of 3GPP TSG RAN WG2 meeting #121bis-e, Online", Apr. 17-26, 2023, pp. 1-316, http://www.3gpp.org.
3GPP, "Report of 3GPP TSG RAN WG2 meeting #122, Incheon, Korea", May 22-26, 2023, pp. 1-339, http://www.3gpp.org.

* cited by examiner

*Primary Examiner* — Will W Lin
(74) *Attorney, Agent, or Firm* — Kevin Radigan, Esq.; Heslin Rothenberg Farley & Mesiti P.C.

(57) ABSTRACT

A method and apparatus to address the problems of supporting uplink positioning in mobile network is provided. The method of the terminal includes receiving a RRC message including SuspendConfig, performing state transition to RRC_INACTIVE and cell selection, determining whether to perform TYPE1-I-SRS transmission or TYPE2-I-CRS transmission based on presence and absence of srs-PosRRC-Inactive and/or srs_positioning_inactive_multi_cell in the SuspendConfig in the RRC message and performing SRS transmission based on determination.

20 Claims, 6 Drawing Sheets

METHOD AND APPARATUS FOR PERFORMING UPLINK POSITIONING IN MOBILE WIRELESS COMMUNICATION SYSTEM

CROSS-REFERENCE TO RELATED APPLICATION

This application claims priority to and the benefit of Korean Patent Application No. 10-2023-0090954, filed on Jul. 13, 2023, the disclosure of which is hereby incorporated herein by reference in its entirety.

BACKGROUND

Technical Field

The present disclosure relates to positioning sounding reference signal transmission in wireless mobile communication system.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

The importance of terminal positioning in new services such as the above-mentioned machine communication is increasing. Positioning can be estimated in consideration of the measurement result of the base station measuring the uplink reference signal transmitted by the terminal or the measurement result of the terminal measuring the downlink reference signal transmitted by the base station.

SUMMARY

Aspects of the present disclosure are to address the problems of supporting uplink positioning in mobile network. The method of the terminal includes receiving a RRC message including SuspendConfig, performing state transition to RRC_INACTIVE and cell selection, determining whether to perform TYPE1-I-SRS transmission or TYPE2-I-CRS transmission based on presence and absence of srs-PosRRC-Inactive and/or srs_positioning_inactive_multi_cell in the SuspendConfig in the RRC message and performing SRS transmission based on determination.

DETAILED DESCRIPTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Figure 1A:
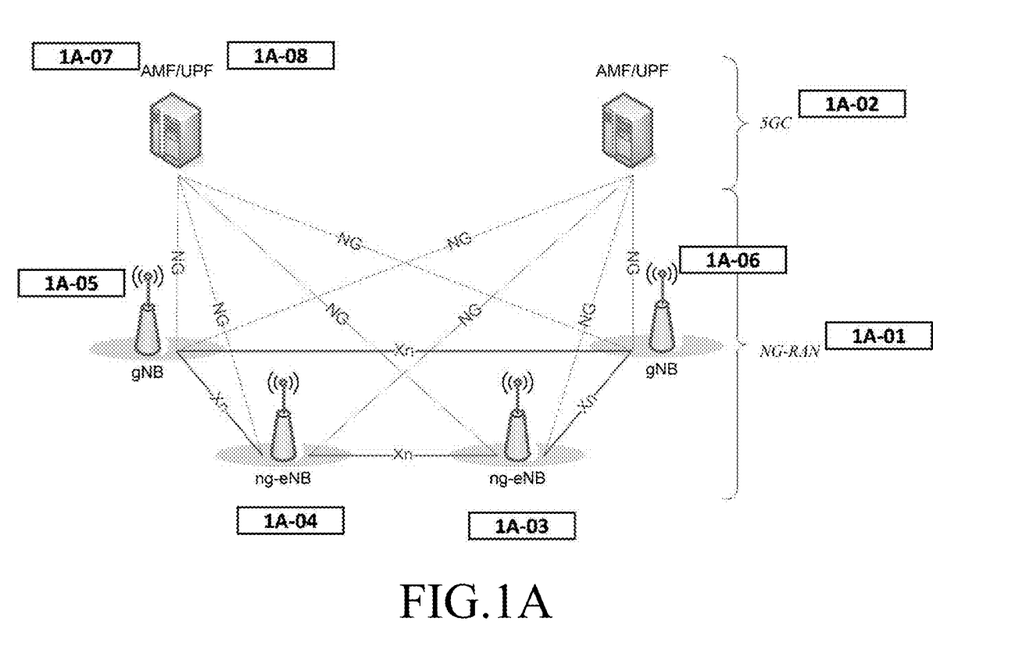
FIG. 1A is a diagram illustrating the architecture of an 5G system and a NG-RAN to which the disclosure may be applied.

FIG. 1A is a diagram illustrating the architecture of an 5G system and a NG-RAN to which the disclosure may be applied.

5G system consists of NG-RAN 1A-01 and 5GC 1A-02. An NG-RAN node is either:
- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.
- Functions for Radio Resource Management such as Radio Bearer Control, Radio Admission Control, Connection Mobility Control, Dynamic allocation of resources to UEs in uplink, downlink and sidelink (scheduling); and
- IP and Ethernet header compression, uplink data decompression and encryption of user data stream; and
- Selection of an AMF at UE attachment when no routing to an MME can be determined from the information provided by the UE; and
- Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
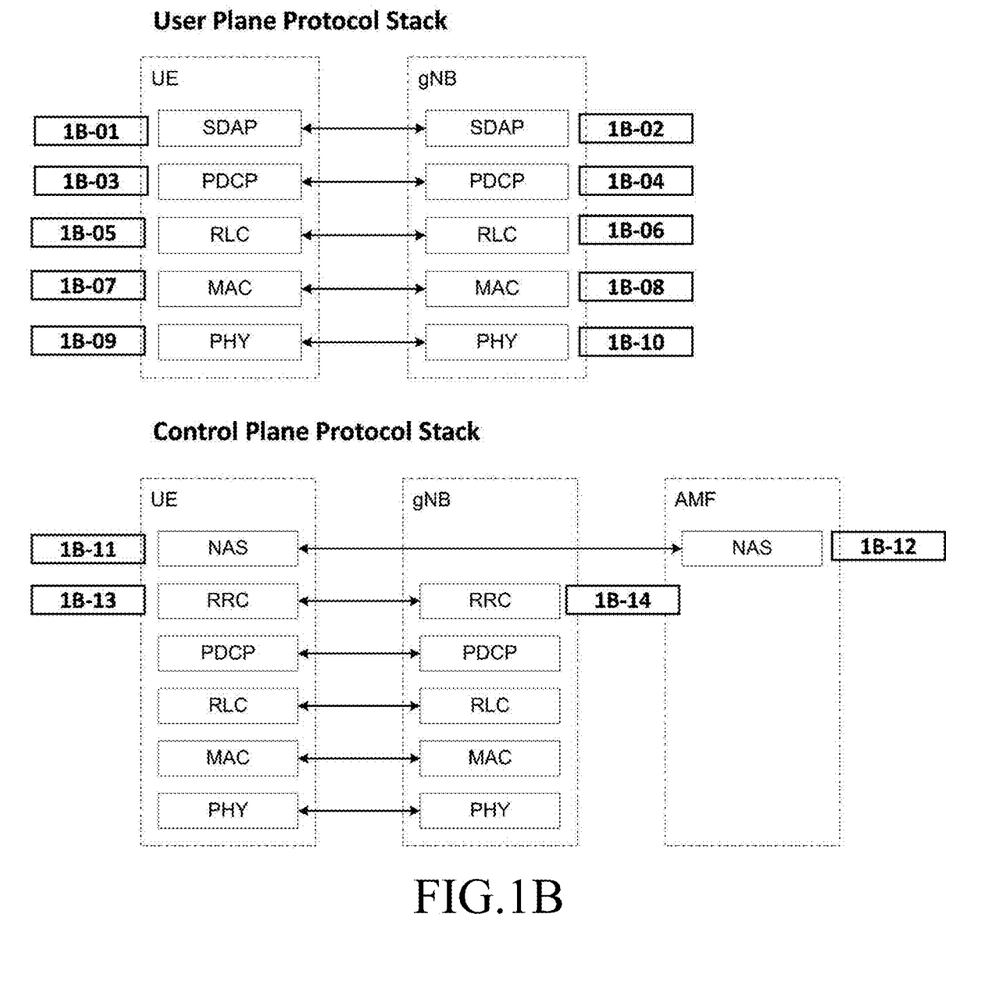
FIG. 1B is a diagram illustrating a wireless protocol architecture in an 5G system to which the disclosure may be applied.

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed below.

NAS: authentication, mobility management, security control etc

RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

Figure 1C:
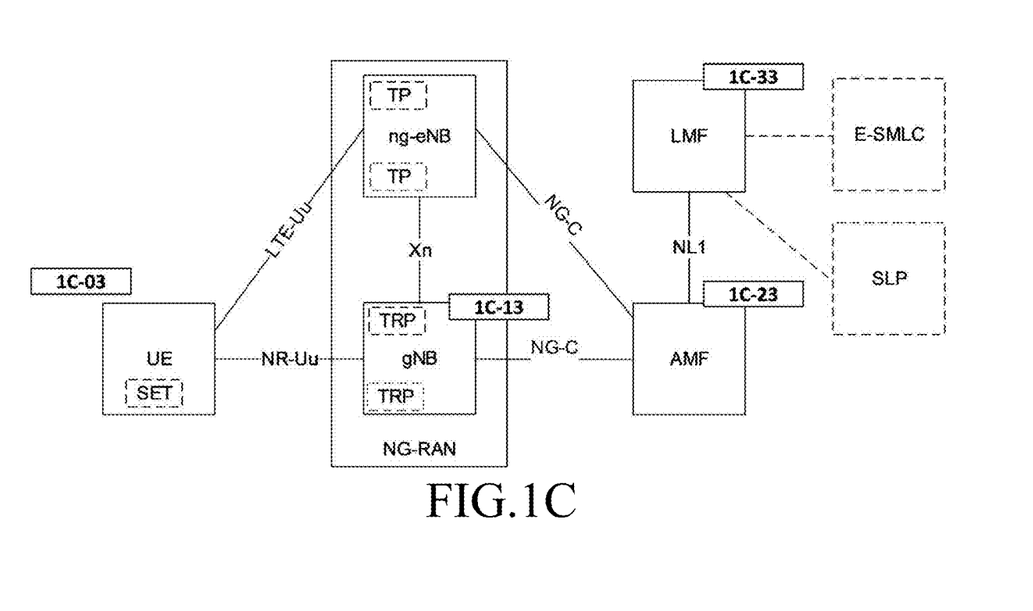
FIG. 1C is a diagram illustrating the architecture of positioning system.

FIG. 1C is a diagram illustrating the architecture of positioning system.

FIG. 1C is a diagram illustrating a structure of a positioning system according to an embodiment of the present disclosure.

The terminal 1C-03 is connected to the LMF 1C-33 through the gNB 1C-13 and the AMF 1C-23. Hereinafter, gNB is also referred to as a base station, AMF as an access mobility function, and LMF as a location management function.

The base station provides the TRP function. AMF stores the capability of the terminal related to location confirmation and relays the signaling between the location management function and the terminal. AMF may be connected to several base stations. One AMF can be connected to several LMFs. The AMF may initially select the LMF for any terminal. The AMF may select another LMF when the terminal moves to a new cell.

The LMF manages the support of different location services for target UEs, including positioning of UEs and delivery of assistance data to UEs.

The LMF may interact with a target UE in order to deliver assistance data if requested for a particular location service, or to obtain a location estimate if that was requested.

For positioning of a target UE, the LMF decides on the position methods to be used The positioning methods may yield a location estimate for UE-based position methods and/or positioning measurements for UE-assisted and network-based position methods. The LMF may combine all the received results and determine a single location estimate for the target UE (hybrid positioning). Additional information like accuracy of the location estimate and velocity may also be determined.

An IE in a field may contain one or more child fields and child IEs. In that sense, an IE can be regarded as a container.

A container contains one or more child fields and child containers. Presence of a (child/downstream) fields under a (parent/upstream) container is determined by the presence of the (parent/upstream) container. A (child/downstream) field associated with a (parent/upstream) container (i.e. a field under a container) is absent if the associated (parent/upstream) container is absent. A (child/downstream) field associated with a container may be present if the associated (parent/upstream) container is present. Presence of a container affects presence of fields under the container.

Presence of a field under a container A is not affected by presence of container B unless the container B is contained in the container A or vice versa.

Container A and container B do not affect each other in terms of presence unless the container B is contained in the container A or vice versa. Presence of a container does not affect the presence of the other container in the same level.

In this invention, XXX_XXX and XxxXxx denotes an IE. xxx_xxx and xxxXxx denotes a field. xxx_XXX denotes a variable. XXX_xxx denotes a value indicated in xxx_xxx field. X denotes an upper character. x denotes an lower character.

In this invention, UE and Terminal and wireless device are used interchangeably. GNB and base station are used interchangeably.

L3-XXX-XXX means Layer 3 control message of XXX-XXX. L2-XXX-XXX means Layer 2 control message (or MAC CE) of XXX-XXX. L1-DCI-N-M means Layer 1 DCI format N_M.

In this invention, a method to reduce network energy consumption is introduced. GNB can configure cell specific active time. By turning off the transmitter during cell specific non active time, GNB energy consumption can be reduced. By turning off the receiver during cell specific non active time, GNB energy consumption can be reduced.

Continuous uplink positioning may be beneficial for some service scenarios such as industrial IoT. For continuous uplink positioning, UE in RRC_INACTIVE state needs to keep positioning SRS transmission even when UE moves between cells.

In this invention, UE may be configured with following SRS which may be valid over various geographical areas and/or frequency domain locations.

RRCRelease and RRCReconfiguration and RRCSetup and RRCReconfigurationComplete are RRC messages.

C-SRS is:
>1: SRS used in RRC_CONNECTED; and
>1: the SRS configuration information of the C-SRS may be provided in a RRCReconfiguration or in a RRCSetup received in a specific cell.
>1: SRS valid in a specific BWP of a specific uplink carrier of the specific cell.
>>2: the specific BWP is the BWP of which configuration information include the SRS configuration information; the specific BWP is the BWP associated with the SRS configuration;
>>2: the specific uplink carrier is the uplink carrier of which configuration information include the BWP information associated with the SRS configuration; the specific uplink carrier is the uplink carrier of which configuration information includes the SRS configuration information;
>>2: the specific cell is the cell of which configuration information includes the uplink carrier configuration information associated with the SRS configuration; the specific cell is the cell of which configuration information includes the SRS configuration information.

TYPE1-I-SRS is:
1>: SRS that is used in RRC_INACTIVE state in a single cell; and
>1: the SRS configuration information of the TYPE1-I-SRS is provided in a RRCRelease received in a specific cell.
1>: SRS that is valid in a specific BWP of a specific uplink carrier of the specific cell
>>2: the configuration information of the specific BWP is provided in the RRCRelease received in the specific cell;
>>2: the specific uplink carrier is an uplink carrier of the specific cell; the configuration information of the specific carrier is in SIB1 of the cell where RRCRelease is received;
>>2: the specific cell is the cell where RRCRelease is received;

TYPE2-I-SRS is:
>1: SRS that is used in RRC_INACTIVE state in two or more cells; and
>1: the SRS configuration information of the TYPE2-I-SRS is provided in a RRCRelease received in a specific cell.
1>: SRS that is valid in a specific BWP of a specific uplink carrier of cells of SRS-Area;
>>2: the configuration information of the specific BWP is provided in the RRCRelease received in the specific cell;
>>>3: the configuration information of the specific BWP is valid in and commonly applied to the cells of SRS-Area
>>2: the specific uplink carrier is an uplink carrier of the cells of SRS-Area; the configuration information of the specific carrier is provided in SIB1 of the cell where RRCRelease is received;
>>2: the SRS-Area is indicated in the RRCRelease.

Based on the requirements at a given circumstances, GNB may configure UE to perform SRS transmission:
>1: in RRC_CONNECTED in a single cell; or
>1: in RRC_INACTIVE in a single cell; or
>1: in RRC_INACTIVE over two or more cells.

Figure 2:
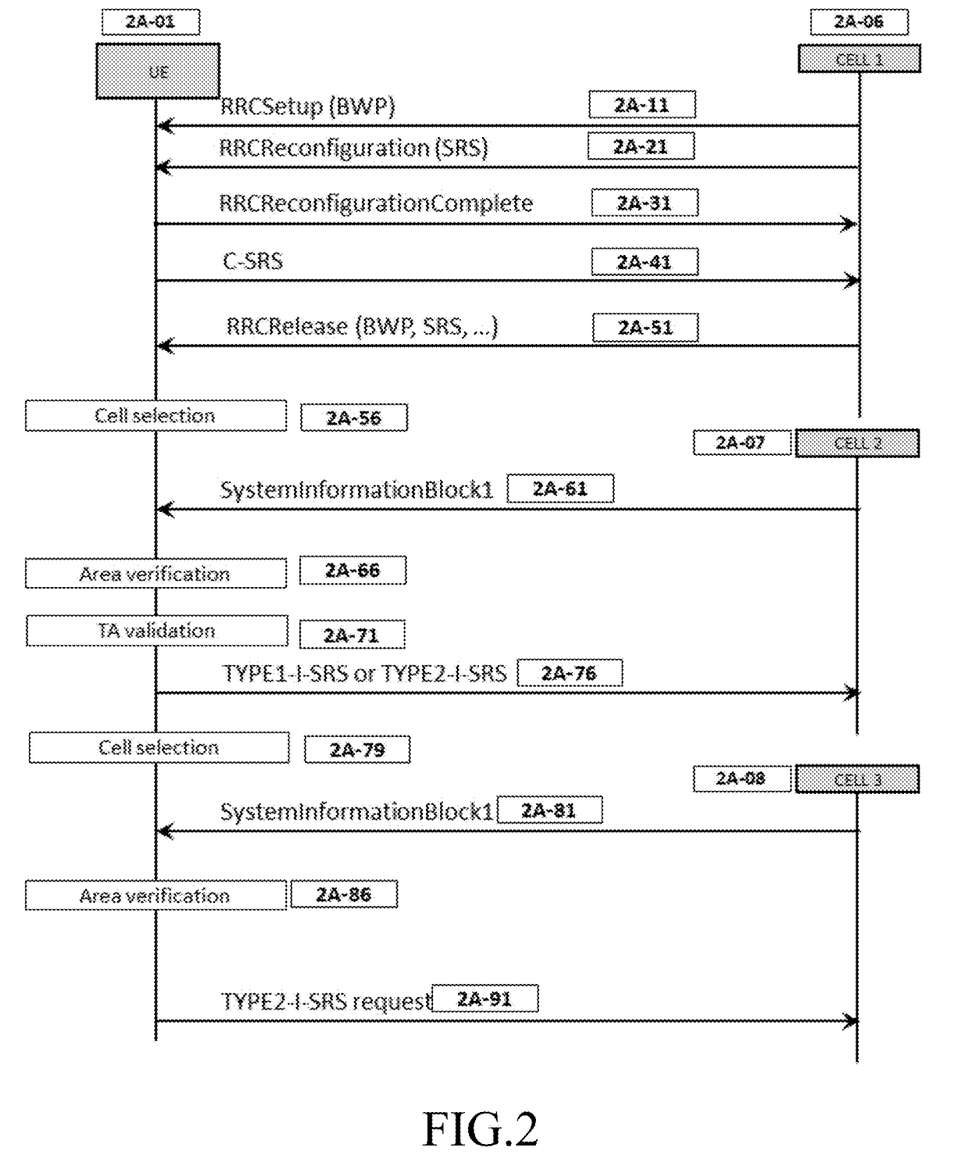
FIG. 2 is a diagram illustrating operations of a terminal and a base station according to an embodiment of the present invention.

FIG. 2 illustrates the operation of UE and GNB for SRS transmission.

At 2A-11, UE may receive from a base station a RRCSetup in a first cell.

The RRCSetup is used to establish RRC connection (e.g. SRB1) between UE and the base station.

The RRCSetup includes various configuration information such as uplink BWP configuration information (e.g. BWP-Uplink) and downlink BWP configuration information (e.g. BWP-Dwonlink).

UE can be configured with one or more uplink BWPs. BWP-Uplink for an uplink BWP may include following fields:
>1: locationAndBandwidth field indicates frequency domain location and bandwidth of this bandwidth part. The value of the field shall be interpreted as resource indicator value (RIV). The first PRB may be a PRB determined by subcarrierSpacing of this BWP and offsetToCarrier (in ServingCellConfigCommonSIB in SIB1).
>1: cyclicPrefix field indicates whether to use the extended cyclic prefix for this bandwidth part. If not set, the UE uses the normal cyclic prefix.
>1: subcarrierSpacing field indicates subcarrier spacing to be used in this BWP for all channels and reference signals unless explicitly configured elsewhere.

After establishing SRB1, UE may report its capability to the base station by transmitting UECapabilityInformation RRC message.

Based on the reported capability and cell load and required traffic requirements, the base station may determine the various configurations for the UE. If SRS is deemed useful, the base station may decide to configure C-SRS for the UE (if not configured yet).

At 2A-21, the base station may transmitto the UE a RRCReconfiguration in the first cell.

The RRCReconfiguration may be used to modify the RRC connection. The message may convey information for measurement configuration, mobility control, radio resource configuration (including RBs, MAC main configuration and physical channel configuration) and AS security configuration. The message may include C-SRS configuration information (e.g., one or more instances of SRS-Config) for the UE.

A SRS-Config is associated with an uplink BWP.

A SRS-Config may include configuration information for one or more SRS resource sets (e.g., one or more SRS-ResourceSet in srs-ResourceSetToAddModList) and/or configuration information for one or more SRS resources (e.g., one or more SRS-Resource in srs-ResourceToAddModList) and/or configuration information for one or more positioning SRS resource set (e.g., one or more SRS-PosResourceSet in srs-PosResourceSetToAddModList) and/or configuration information for one or more positioning SRS resources (e.g., one or more SRS-PosResource in srs-PosResourceToAddModList).

A SRS-PosResourceSet IE may include information for positioning SRS resource set. A SRS-PosResourceSet IE may be for either C-SRS or TYPE1-I-SRS or TYPE2-I-SRS depending on in which parent IE and in which RRC message the SRS-PosResourceSet IE may be included.

A SRS-PosResourceSet IE may include following fields:
- >1: srs-PosResourceSetId field indicates the identifier of this positioning SRS resource set (SRS-PosResourceSet).
- >1: srs-PosResourceIdList field indicates the identifiers of SRS-PosResources that comprises the SRS-PosResourceSet.
- >1: alpha field indicates alpha value for SRS power control. The value indicated by this field may be applied to all (one or more) SRS-PosResources that belong to the SRS-PosResourceSet.
- >1: p0 field indicates P0 value for SRS power control. The value indicated by this field may be applied to all (one or more) SRS-PosResources that belong to the SRS-PosResourceSet.
- >1: resourceType field indicates time domain behavior of SRS resource configuration. Either aperiodic or periodic or semi-persistent is indicated.
- >1: pathlossReferenceRS-Pos field indicates a reference signal (e.g., a SS block or a DL-PRS config) to be used for SRS path loss estimation; This field includes either ssb-IndexServing field or ssb-Ncell field or dl-PRS field;
- >>2: ssb-IndexServing indicates SSB index belonging to a serving cell where the SRS may be configured.
- >>2: ssb-NCell indicates a SSB configuration from neighboring cell (e.g. SSB-InfoNcell).
- >>2: dl-PRS indicates a PRS configuration (e.g., DL-PRS-Info).

A SRS-PosResource IE may include the configuration information for positioning SRS. A SRS-PosResource IE is for either C-SRS or TYPE1-I-SRS or TYPE2-I-SRS depending on in which parent IE/container and in which RRC message the SRS-PosResource IE is included.

A SRS-PosResource IE may include following fields:
- >1: srs-PosResourceId field indicates the identifier of the positioning SRS resource;
- >1: resourceType field indicates periodicity and offset for semi-persistent and periodic SRS resource, or slot offset for aperiodic SRS resource for positioning;
- >1: resourceMapping field indicates OFDM symbol location of the SRS resource within a slot including nrofSymbols (number of OFDM symbols), startPosition (value 0 refers to the last symbol, value 1 refers to the second last symbol, and so on) and repetitionFactor;
- >1: spatialRelationInfoPos field indicates configuration of the spatial relation between a reference RS and the target SRS. Reference RS can be SSB/CSI-RS/SRS/DL-PRS.
- >1: freqHopping field indicates:
- >>2: SRS bandwidth of the positioning SRS resource;
- >>2: hopping bandwidth of the positioning SRS resource;
- >1: freqDomainShift field indicates configurable shift from the frequency domain position.

freqDomainPosition field indicates the frequency domain position of SRS resource by indicating an integer between 0 and 67 . . . .

For positioning SRS resource, freqDomainPosition is not explicitly signaled. A fixed value of 0 is applied to positioning SRS resource.

Positioning SRS transmission may be performed with frequency-hopping within an uplink bandwidth part. UE determines the hopping pattern based on the position and the size of the uplink bandwidth part.

At 2A-31, UE may transmit to the base station a RRCReconfigurationComplete to confirm successful completion of RRC connection reconfiguration.

At 2A-41, UE may perform SRS transmission in RRC connected mode (C-SRS) based on SRS configuration and BWP configuration and cell configuration.

For C-SRS transmission in the cell 1, UE may:
- >1: determine the frequency domain resource for C-SRS transmission based on:
- >>2: locationAndBandwidth field, for the current active BWP, received in
  RRCSetup or in RRCReconfiguration RRC message; and
- >>2: offsetToCarrier field indicated in ServingCellConfigCommon in RRCSetup or in ServingCellConfigCommonSIB in SIB1 of the cell 1;
- >>2: freqHopping field and freqDomainShift field in SRS-PosResource in RRCReconfiugration RRC message;
- >1: determine the time domain resource for C-SRS transmission based on resourceMapping field received in RRCReconfiguration.

UE may stop C-SRS transmission upon BWP switch or upon C-SRS release instructed by another RRCReconfiguration.

RRCSetup and RRCReconfiguration and SIB1 above are received in the cell1.

At some point of time, GNB may decides to change RRC state of the UE from RRC_CONNECTED to RRC_INACTIVE. If user traffic for the UE is exhausted but SRS transmission is still required for positioning purpose, putting UE in RRC_INACTIVE is better option for UE power consumption perspective.

At 2A-51, GNB may transmit to the UE a RRCRelease to instruct state transition to RRC_INACTIVE and positioning SRS transmission in RRC_INACTIVE.

For state transition to RRC_INACTIVE, GNB includes a SuspendConfig IE in the RRCRelease. SuspendConfig IE may include various fields related to RRC_INACTIVE state. More specifically, SuspendConfig IE may include following fields:
- >1: ran-ExtendedPagingCycle indicates the extended DRX (eDRX) cycle for RAN-initiated paging to be applied by the UE. Value rf256 corresponds to 256 radio frames, value rf512 corresponds to 512 radio frames and so on. Value of the field indicates an eDRX cycle which may be shorter or equal to the IDLE mode eDRX cycle configured for the UE;
- >1: ran-NotificationAreaInfo indicates RAN-based Notification Area (RNA) where UE can move between RNA cells without reporting location change to the base station; This field includes one or more PLMN-RAN-ArcaCell IEs.
- >>2: A PLMN-RAN-AreaCell IE may include a PLMN-Identity and one or more CellIdentity.
- >>>3: CellIdentity is 36 bit long.
- >>>3: CellIdentity uniquely identify a cell within a PLMN.
- >>>3:22~ 32 leftmost bits of the CellIdentity IE correspond to GNB ID>
- >1: ran-PagingCycle indicates the UE specific cycle for RAN-initiated paging.
- >1: t380 may be the timer that triggers the periodic RNAU procedure in UE. Value min5 corresponds to 5 minutes, value min10 corresponds to 10 minutes and so on.
- >1: srs-PosRRC-Inactive may include parameters for SRS transmission on a single cell in RRC_INACTIVE (e.g., TYPE1-I-SRS).

>1: srs_positioning_inactive_multi-cell include parameters for SRS transmission on multiple cells in RRC_INACTIVE (e.g., TYPE2-I-SRS) srs-PosRRC-Inactive includes following fields:
>1: bwp-NUL field includes BWP configuration for SRS for Positioning during the RRC_INACTIVE state (TYPE1-I-SRS) in Normal Uplink Carrier of a specific cell.
>>2: If the field is absent and srs-PosConfigNUL field is present,
>>>3: UE is configured with a SRS for Positioning associated with the initial UL BWP of the normal uplink carrier of the specific cell; and
>>>3: UE may transmit, during the RRC_INACTIVE state, inside the initial UL BWP of the normal uplink carrier with the same CP and SCS as configured for initial UL BWP of the normal uplink of the specific cell.
>1: bwp-SUL field includes BWP configuration for SRS for Positioning during the RRC_INACTIVE state in Supplementary Uplink Carrier of a specific cell.
>>2: If the field is absent and srs-PosConfigSUL field is present,
>>>3: UE may be configured with a SRS for Positioning associated with the initial UL BWP of the supplementary uplink carrier of the specific cell; and
>>>3: UE may transmit, during the RRC_INACTIVE state, inside the initial UL BWP of the supplementary uplink carrier with the same CP and SCS as configured for initial UL BWP of the supplementary uplink carrier of the specific serving cell.
>1: srs-PosConfigNUL field includes positioning SRS in RRC_INACTIVE state (TYPE1-I-SRS) in Normal Uplink Carrier of the specific serving cell. This field contains a SRS-PosConfig IE.
>1: srs-PosConfigSUL field includes SRS for Positioning configuration in RRC_INACTIVE state (TYPE1-I-SRS) in Supplementary Uplink Carrier. This field contains a SRS-PosConfig IE.
>1: inactivePosSRS-RSRP-ChangeThreshold field indicates RSRP threshold for the increase/decrease of RSRP for time alignment validation.
>1: inactivePosSRS-TimeAlignmentTimer field indicates TAT value for SRS for positioning transmission (TYPE1-I-SRS) during RRC_INACTIVE state.

SRS-PosConfig IE may include parameters for positioning SRS transmission during RRC_INACTIVE state. The IE may include following fields:
>1: srs-PosResourceSetToReleaseList field includes one or more SRS-PosResourceSetId. UE may release the indicated SRS-PosResrouceSet.
>1: srs-PosResourceSetToAddModList field includes one or more SRS-PosResourceSet. UE may perform SRS transmission in the indicated SRS-PosResourceSet.
>1: srs-PosResource ToReleaseList field includes one or more SRS-PosResourceId. UE may release the indicated SRS-PosResource and may not transmit SRS on the indicated resource.
>1: srs-PosResourceToAddModList field indlcudes one or more SRS-PosResource. UE may perform SRS transmission in the indicated SRS-PosResource.

Srs_Positioning_Inactive_Multi_Cell
srs-PosRRC-Inactive may include following fields:
>1: bwp_NUL_multi_cell field includes BWP configuration for SRS for Positioning during the RRC_INACTIVE state in Normal Uplink Carrier in two or more cells (TYEP2-I-SRS). bwp_NUL_multi_cell may include parameters applied to two or more cells.
>>2: If the field is absent and srs_PosConfigNUL_multi_cell field is present,
>>>3: UE may be configured with a SRS for Positioning associated with the initial UL BWP of the normal uplink carrier of a specific cell for two or more cells; and
>>>3: UE may transmit, in two or more cells during the RRC_INACTIVE state, inside the frequency domain portion equivalent to the initial UL BWP of the normal uplink carrier of the specific cell with the same CP and SCS as configured for initial UL BWP of the normal uplink of the specific cell. The specific cell may be the cell where RRCRelease (srs_positioning_inactive_multi_cell) may be received.
>1: bwp_SUL_multi-cell field includes BWP configuration for SRS for Positioning during the RRC_INACTIVE state in Supplementary Uplink Carrier of two or more cells (TYEP2-I-SRS). bwp_SUL_multi-cell includes parameters applied to two or more cells.
>>2: If this field is absent and srs_PosConfigSUL_multi_cell field is present:
>>>3: UE is configured with a SRS for Positioning associated with the initial UL BWP of the supplementary uplink carrier of a specific cell for two or more cells; and
>>>3: UE may transmit, in two or more cells during the RRC_INACTIVE state, inside the frequency domain portion equivalent to the initial UL BWP of the supplementary uplink carrier of the specific cell with the same CP and SCS as configured for initial UL BWP of the supplementary uplink of the specific cell. The specific cell may be the cell where RRCRelease (srs_positioning_inactive_multi_cell) is received.
>1: srs_PosConfigNUL_multi_cell field includes SRS for Positioning configuration in RRC_INACTIVE state in Normal Uplink Carrier for two or more cells (TYPE2-I-SRS). This field contains a SRS-PosConfig IE.
>1: srs_PosConfigSUL_multi_cell field includes SRS for Positioning configuration in RRC_INACTIVE state in Supplementary Uplink Carrier for two or more cells (TYPE2-I-SRS). This field contains a SRS-PosConfig IE.
>1: inactivePosSRS-RSRP-ChangeThreshold_multi_cell field indicates RSRP threshold for the increase/decrease of RSRP for time alignment validation for TYPE2-I-SRS. This field includes a parameter applicable to two or more cells.
>1: inactivePosSRS_TimeAlignmentTimer_multi_cell field indicates Time Alignment Timer value for SRS for positioning transmission during RRC_INACTIVE state in two or more cells. This field includes a parameter applicable to two or more cells.
>1: srs_PosConfig_cell_list field indicates two or more cells where TYPE2-I-SRS can be transmitted. This field includes a SRS_AreaCell IE or an same_as_RNA indicator.
>>2: A SRS-AreaCell IE includes either two or more CellIdentity or two or more PhysicalCellId.
>>>3: unlike RNA which covers relatively wide area, SRS-Area covers narrow area consisting of one or more adjacent cells. Because of that, SRS-AreaCell IE does not include PLMN identity.
>>>3: if CellIdentity is included, UE determines that a cell which broadcast the same CellIdentity in the SIB1 belongs to SRS-Area;

>>>3: if PhysicalCellId is included, UE determines that a cell with the same PhysicalCellId in a specific frequency layer belongs to SRS-Area;
>>>4: the specific frequency layer is the frequency layer where the specific cell belongs to (e.g., the frequency layer with same ARFCN as specific cells' ARFCN).
>>>3: CellIdentity indicates (corresponds to) a base station and a cell;
>>>3: PhysicalCellId indicates (corresponds to) a cell;
>>2: same_as_RNA indicator indicates whether SRS-Area (where TYPE2-I-SRS may be valid) is same as RNA.

Based on the information included in RRCRelease, UE may perform RRC state transition to RRC_INACTIVE and cell selection 2A-56.

Cell selection and cell reselection are the process by which a UE selects a cell to camp on in order to receive service from the network.

The difference is that:
>1: in cell selection, UE try to find a suitable cell by scanning all RF channels in the NR bands according to its capabilities or by stored information on frequencies;
>1: in cell reselection, UE try to find a suitable cell based on the system information received in the currently camped cell.

UE may select a cell that is different from the cell where RRCRelease is received (e.g., UE selects the cell 2 2A-07 from the cell 1 2A-06).

At 2A-61, UE may receive a system information block 1 (SIB1) in the cell2.

SIB1 contains information relevant when evaluating if a UE is allowed to access a cell and defines the scheduling of other system information. It also contains radio resource configuration information that is common for all UEs and barring information applied to the unified access control.

A cell can be assigned with a one or more cellIdentity. In this case, SIB1 includes one or more cellIdentity. SIB1 also includes a ServingCellConfigCommonSIB.

The ServingCellConfigCommonSIB is used to configure cell specific parameters of a UE's serving cell in SIB1.

ServingCellConfigCommonSIB may include following fields:
>1: downlinkConfigCommon field includes DownlinkConfigCommonSIB IE
>1: uplinkConfigCommon field includes UplinkConfigCommonSIB IE for normal uplink carrier of the cell
>1: supplementaryUplink field includes UplinkConfigCommonSIB IE for supplementary uplink carrier of the cell
>1: n-TimingAdvanceOffset field indicates the N_TA-Offset to be applied for all uplink transmissions on this serving cell. If the field is absent, the UE applies the value defined for the duplex mode and frequency range of this serving cell.

UplinkConfigCommonSIB IE may include following fields:
>1: frequencyInfoUL field includes FrequencyInfoUL-SIB IE.
>1: initialUplinkBWP field includes BWP-UplinkCommon IE for the initial uplink BWP of the cell.
>1: timeAlignmentTimerCommon field includes TimeAlignmentTimer IE for time alignment timer to applied during initial random access procedure.

FrequencyInfoUL-SIB IE may include following fields:
>1: absoluteFrequencyPointA field includes ARFCN-ValueNR IE;
>>2: absoluteFrequencyPointA indicates Absolute frequency of the reference resource block (Common RB 0). Its lowest subcarrier may be also known as Point A.
>1: scs-SpecificCarrierList field includes one or more SCS-SpecificCarrier IEs;
>>2: scs-SpecificCarrierList field indicates a set of carriers for different subcarrier spacings (numerologies).
>>2: each of SCS-SpecificCarrier provides parameters determining the location and width of the actual carrier or the carrier bandwidth. A SCS-SpecificCarrier may include following fields:
>>>3: offsetToCarrier field indicates an integer between 0 and 2199. This field indicates offset in frequency domain between Point A (lowest subcarrier of common RB 0) and the lowest usable subcarrier on this carrier in number of PRBs (using the subcarrierSpacing defined for this carrier).
>>2 if UE is performing TYPE2-I-SRS transmission in cell2 (e.g. cell belongs to SRS-Area but not the cell where RRCRelease is received), UE may apply, to TYPE2-I-SRS transmission in cell2, the value contained in the field received in cell1 (e.g. cell where RRCRelease is received);
>>2 if UE is performing TYPE1-I-SRS transmission in cell1, UE may apply, to TYPE1-I-SRS transmission in cell 1, the value contained in the field received in cell1 (e.g. cell where RRCRelease is received);
>>>3: subcarrierSpacing indicates subcarrier spacing of this carrier. It may be used to convert the offsetToCarrier into an actual frequency.
>>>>4: if UE is performing TYPE2-I-SRS transmission in cell2 (e.g. cell belongs to SRS-Area but not the cell where RRCRelease is received), UE may apply, to TYPE2-I-SRS transmission in cell2, the value contained in the field received in cell1 (e.g. cell where RRCRelease is received);
>>>>4: if UE is performing TYPE1-I-SRS transmission in cell1, UE may apply, to TYPE1-I-SRS transmission in cell 1, the value contained in the field received in cell1 (e.g. cell where RRCRelease is received);
>>>3: carrierBandwidth indicates width of this carrier in number of PRBs (using the subcarrierSpacing defined for this carrier);
>>>>4: if UE is performing TYPE2-I-SRS transmission in cell2 (e.g. cell belongs to SRS-Area but not the cell where RRCRelease is received), UE may apply, to TYPE2-I-SRS transmission in cell2, the value contained in the field received in cell1 (e.g. cell where RRCRelease is received);
>>>>4: if UE is performing TYPE1-I-SRS transmission in cell1, UE may apply, to TYPE1-I-SRS transmission in cell 1, the value contained in the field received in cell1 (e.g. cell where RRCRelease is received);
>1: frequencyShift7p5khz field indicates whether the NR UL transmission with a 7.5 kHz shift to the LTE raster may be enabled. If the field is absent, the frequency shift may be disabled.
>>2 if UE is performing TYPE2-I-SRS transmission in cell2 (e.g. cell belongs to SRS-Area but not the cell where RRCRelease is received), UE may apply, to TYPE2-I-SRS transmission in cell2, the value contained in the field received in cell1 (e.g. cell where RRCRelease is received);
>>2 if UE is performing TYPE1-I-SRS transmission in cell1, UE may apply, to TYPE1-I-SRS transmission in cell 1, the value contained in the field received in cell1 (e.g. cell where RRCRelease is received);

>1: p-Max field includes P-Max IE.
>>2: p-Max indicates Value in dBm applicable for the cell.
>>2 if UE is performing TYPE2-I-SRS transmission in cell2 (e.g. cell belongs to SRS-Area but not the cell where RRCRelease is received), UE may apply, to TYPE2-I-SRS transmission in cell2, the value contained in the field received in cell1 (e.g. cell where RRCRelease is received);
>>2 if UE is performing TYPE1-I-SRS transmission in cell1, UE may apply, to TYPE1-I-SRS transmission in cell 1, the value contained in the field received in cell1 (e.g. cell where RRCRelease is received);

At 2A-66, UE may perform SRS-AREA-VERIFICATION.

If TYPE1-I-SRS is configured, UE may:
>1: determine the SRS-AREA-VERIFACTION is successful if the selected cell (e.g., the new suitable cell after cell selection) is the cell where RRCRelease is received (e.g., SRS configuration information for TYPE1-I-SRS is received);
>1: determine the SRS-AREA-VERIFACTION is unsuccessful if the selected cell (e.g., the new suitable cell after cell selection) is not the cell where RRCRelease is received (e.g., SRS configuration information for TYPE1-I-SRS is received).

If TYPE2-I-SRS may be configured, UE may:
>1: determine the SRS-AREA-VERIFACTION is successful if the selected cell (e.g., the new suitable cell after cell selection) is one of the cells indicated in srs_PosConfig_cell_list (or belongs to SRS-Area);
>1: determine the SRS-AREA-VERIFACTION is unsuccessful if the selected cell (e.g., the new suitable cell after cell selection) is not one of the cells indicated in srs_PosConfig_cell_list (does not belong to SRS-Area);

If SRS-AREA-VERIFICATION is successful, UE may proceed to TA validation procedure.

If SRS-AREA-VERIFICATION is unsuccessful, UE may:
>1: if TYPE1-I-SRS is configured (e.g., SRS-AREA-VERIFICATION for TYPE1-I-SRS is unsuccessful),
>>2: stop TYPE1-I-SRS transmission; and
>>2: release TYPE1-I-SRS resource;
>1: if TYPE2-I-SRS is configured (e.g., SRS-AREA-VERIFICATION for TYPE2-I-SRS is unsuccessful),
>>2: stop TYPE2-I-SRS transmission; and
>>2: release TYPE2-I-SRS resource; and
>>2: perform a procedure to request TYPE2-I-SRS resource.

At 2A-71, UE may perform TA validation if SRS-AREA-VERIFICATION is successful.

For TA validation, UE consider whether inactivePosSRS-TimeAlignmentTimer or inactivePosSRS_TimeAlignmentTimer_multi_cell is running and how RSRP of the camped cell (e.g., serving cell) is.

At 2A-76, UE may perform TYPE1-I-SRS transmission or TYPE2-I-SRS transmission in cell2.

UE may perform TYPE1-1-SRS transmission if following conditions are met:
>1: TYPE1-I-SRS is configured; and
>1: the cell2 is the cell where RRCRelease (or TYPE1-I-SRS resource configuration information) is received; and
>1: TA validation is successful.

UE may perform TYPE2-I-SRS transmission if following conditions are met:
>1: TYPE2-I-SRS is configured; and
>1: the cell2 is a cell indicated by SRS-Area info; and
>1: TA validation is successful.

For TYPE1-I-SRS transmission in a first cell, UE may:
>1: determine the first BWP based on a first offsetToCarrier and a first locationAndBandwidth;
>>2: the first offsetToCarrier is indicated in system information received in the cell where RRCRelease is received;
>>>3: the RRCRelease is the RRC message that includes the configuration information of TYPE1-I-SRS;
>>2 the first locationAndBandwidth is indicated in the RRCRelease;
>>2: the first BWP is the BWP where SRS transmission is performed;
>>2: the first BWP is a BWP of a first cell;
>>3: the first cell is the cell where RRCRelease is received;
>1: perform SRS transmission such that frequency hopping of SRS transmission is confined within the first BWP;
>1: determines the SRS transmission power based on a first P-max and a first freqHopping;
>>2: SRS transmission power in dB level is sum of SRS specific power offset (such as alpha and p0) and pathloss and power control adjustment states and a value determined from SRS bandwidth;
>>>3 SRS bandwidth is determined from freqHopping;
>>2: SRS transmission power is upper bounded by P-max;
>>2: the first freqHopping is indicated in srs-PosRRC-Inactive in RRCRelease;
>>2: the first p-Max is indicated in the system information of the cell where the RRCRelease is received;
>1: determines T_TA of the SRS based on a first n-TimingAdvanceOffset and current N_TA;
>>2: Uplink frame number i for transmission from the UE starts T_TA=(N_TA+N_TA_offset)*T_c before the start of the corresponding downlink frame i at the UE
>>>3: the N_TA_offset is indicated by n-TimingAdvanceOffset in the system information of the cell where the RRCRelease is received;
>>>>3: N_TA may be initialized during random access procedure and updated by TA command transmitted by the base station For TYPE1-2-SRS transmission in the first cell, UE may:
>1: determine the second BWP based on a second offsetToCarrier and a first locationAndBandwidth;
>>2: the second offsetToCarrier is indicated in system information received in the second cell
>>>3: the second cell is the cell where RRCRelease is received;
>>>3: the RRCRelease includes the configuration information of TYPE2-I-SRS;
>>2 the first locationAndBandwidth is indicated in the RRCRelease;
>>2: the second BWP is the BWP where SRS transmission is performed;
>>2 the second BWP is the BWP of the first cell
>>>3: the first cell is a cell belonging to SRS-Area;
>>>3: the first cell is different from the second cell;
>1: perform SRS transmission such that frequency hopping of SRS transmission is confined within the second BWP;

>1: determines the SRS transmission power based on a second P-max and a first freqHopping;
>>2: the first freqHopping is indicated in srs_positioning_inactive_multi_cell in RRCRelease;
>>2: the second p-Max is indicated in the system information of the second cell;
>1: determines T_TA of the SRS based on a secondt n-TimingAdvanceOffset and current N_TA;
>>2: the second N_TA_offset may be indicated by n-TimingAdvanceOffset in the system information of the second cell;

At 2A-79, UE may perform cell selection toward cell3 2A-08.

At 2A-81, UE may receive a system information block 1 (SIB1) in the cell3.

At 2A-86, UE may perform SRS-AREA-VERIFICATION for cell3.

At 2A-91, UE may perform TYPE2-I-SRS-REQUEST message to the base station in cell3 if SRS-AREA-VERIFICATION for cell3 fails.

Terminal may perform followings for SRS transmission in RRC_INACTIVE.

Figure 3:
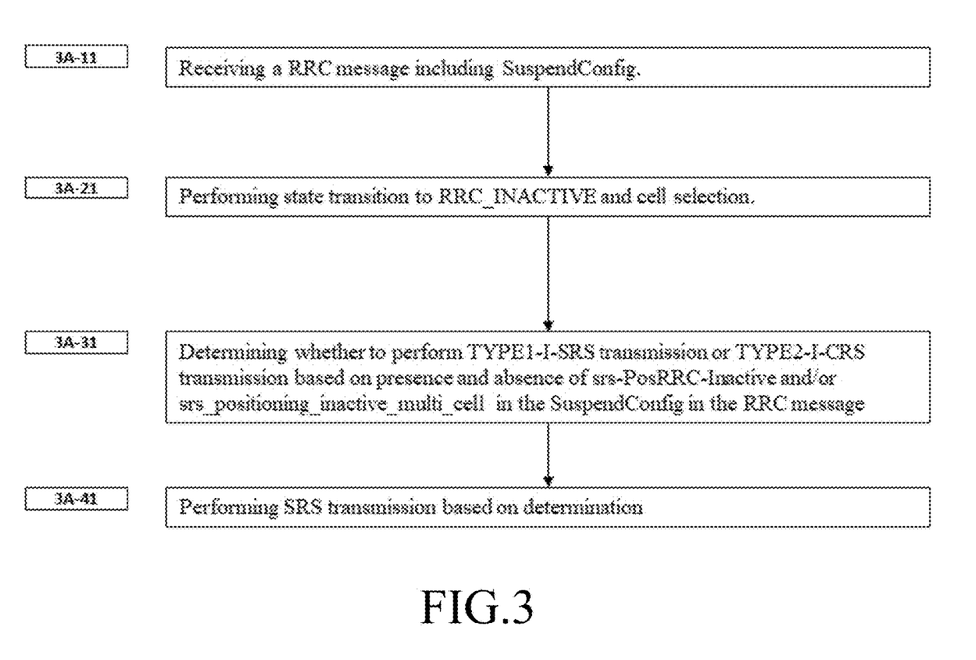
FIG. 3 is a flow diagram illustrating an operation of a terminal.

Before performing following operations, UE may receive RRC messages and/or system information in one or more cells.
>1: Terminal determines whether to perform TYPE1-I-SRS transmission or TYPE2-I-SRS transmission based on presence and absence of srs-PosRRC-Inactive and/or srs_positioning_inactive_multi_cell in the RRCRelease;
>>2: if the srs-PosRRC-Inactive is present and srs_positioning_inactive_multi_cell is absent in the RRCRelease,
>>>3: terminal determines to perform TYPE1-I-SRS transmission based on srs-PosRRC-Inactive;
>>2: if the srs-PosRRC-Inactive is absent and srs_positioning_inactive_multi_cell is present in the RRCRelease,
>>>3: terminal determines to perform TYPE2-I-SRS transmission based on srs_positioning_inactive_multi_cell.
>1: srs-PosRRC-Inactive includes SRS configuration information and BWP configuration information and information indicating either normal uplink carrier or supplementary uplink carrier;
>1: srs_positioning_inactive_multi_cell includes SRS-Area information and BWP configuration information and information indicating either normal uplink carrier or supplementary uplink carrier;
>1: In TYPE1-I-SRS transmission operation,
>>2: SRS transmission is performed in a specific cell by a terminal in RRC_INACTIVE;
>1: In TYPE2-I-SRS transmission operation,
>>2: SRS transmission is performed in two or more cells indicated by SRS-Area by a terminal in RRC_INACTIVE.
>1: Terminal in RRC_INACTIVE may perform SRS transmission based on BWP configuration information included in the RRCRelease;
>>2: if SRS-Area information is absent in the RRCRelease.
>>>3: the BWP configuration information is applied to a specific single cell;
>>2: if SRS-Area information is present in the RRCRelease;
>>>3: the BWP configuration information is applied to specific two or more cells;

Usually, RRC_INACTIVE UE may perform uplink transmission in an initial uplink BWP. For better cell resource utilization (and more flexibility in configuring TYPE2-I-SRS resource across multiple cells), UE may perform initial random access procedure and TYPE2-I-SRS transmission in different BWPs.
>1: Terminal in RRC_INACTIVE in a first cell may perform uplink transmission for random access (e.g. for RRC connection resumption or SDT) in a first uplink BWP of the first cell and may perform uplink transmission for SRS in a second uplink BWP of the first cell;
>>the first uplink BWP is determined from a first offsetToCarrier and a first location AndBandwidth;
>>>3: the first offsetToCarrier is indicated in the system information of the first cell;
>>>3: the first locationAndBandwidth is indicated in the system information of the first cell;
>>the second uplink BWP is determined from a second offsetToCarrier and a second locationAndBandwidth;
>>>3: the second offsetToCarrier is indicated in the system information of the second cell;
>>>3: the first locationAndBandwidth is indicated in a RRC message received in the second cell;

The cellIdentity of the first cell and the cellIdentity of the second cell are different.
>1: Terminal determines the frequency domain portion for SRS transmission in a second cell based on:
>>2: offsetToCarrier (indicating offset between lowest subcarrier of common RB 0 and the lowest usable subcarrier) in system information received in a first cell and locationAndBandwidth (indicating frequency domain location and bandwidth of a BWP) in a RRC message received in the first cell;
>>>3: the RRC message may include information for state transition from RRC_CONNECTED to RRC_INACTIVE;
>>>3: the second cell may be indicated in SRS-Area information in the RRC message.
>1: Terminal in RRC_INACTIVE may perform SRS transmission in a second cell based on:
>>2: offsetToCarrier (indicating offset between lowest subcarrier of common RB 0 and the lowest usable subcarrier) and locationAndBandwidth (indicating frequency domain location and bandwidth of a BWP) in system information of a first cell; and
>>2: n-TimingAdvanceOffset (indicating N_TA offset to be applied for uplink transmission in a serving cell) and p-Max (maximum uplink transmission power of a serving cell) in system information of the second cell
>>2: the first cell is the cell where the RRC message is received
>>2: the second cell is indicated in SRS-Area information in the RRC message FIG. 3 illustrates operation of terminal.

At 3A-11, UE receives a RRC message including SuspendConfig.

At 3A-21, UE performs state transition to RRC_INACTIVE and cell selection.

At 3A-31, UE determines whether to perform TYPE1-I-SRS transmission or TYPE2-I-CRS transmission based on presence and absence of srs-PosRRC-Inactive and/or srs_positioning_inactive_multi_cell in the SuspendConfig in the RRC message.

At 3A-41, UE performs I-SRS transmission based on determination.

srs-PosRRC-Inactive includes SRS configuration information and BWP configuration information and information indicating either normal uplink carrier or supplementary uplink carrier.

srs_positioning_inactive_multi_cell includes SRS-Area information and BWP configuration information and information indicating either normal uplink carrier or supplementary uplink carrier.

Figure 4A:
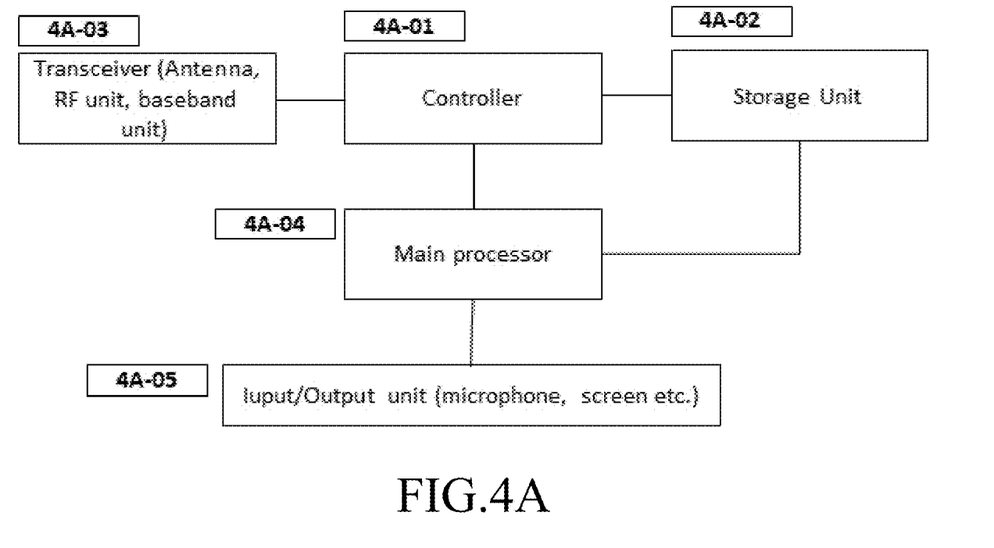
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
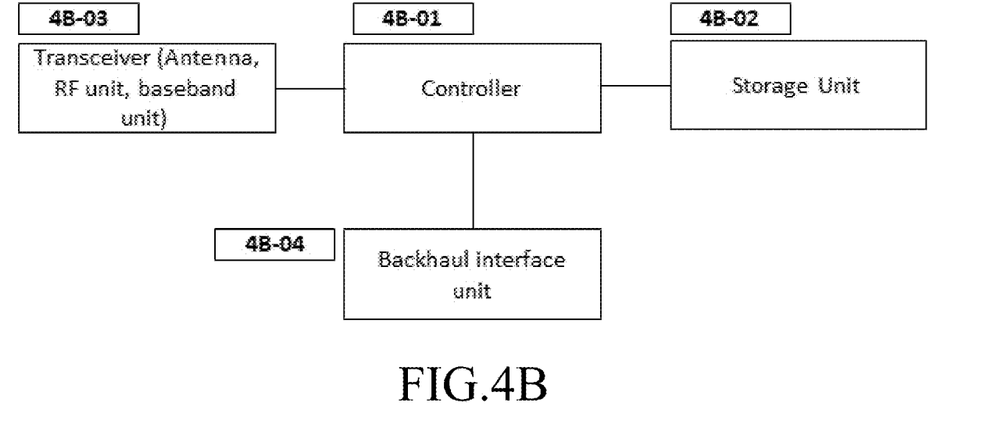
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2 are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

Below table lists acronym used in the present invention.

TABLE 1

| Acronym | Full name |
| --- | --- |
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |
| CAG | Closed Access Group |
| CG | Cell Group |
| C-RNTI | Cell RNTI |
| CRP | Cell Reselection Priority |

TABLE 1-continued

| Acronym | Full name |
|---|---|
| CSI | Channel State Information |
| DCI | Downlink Control Information |
| DL-AoD | Downlink Angle-of-Departure |
| DL-PRS | Downlink-Positioning Reference Signal |
| DRB | (user) Data Radio Bearer |
| DTX | Discontinuous Reception |
| FPP | First positioning protocol |
| GNSS | Global Navigation Satellite System |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RAR | Random Access Response |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SL-PRS | Sidelink-Positioning Reference Signal |
| SpCell | Special Cell |
| SRB | Signalling Radio Bearer |
| SRS | Sounding Reference Signal |
| SS | Search Space |
| SSB | SS/PBCH block |
| SPP | Second positioning protocol |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |

What is claimed is:

1. A method by a terminal, the method comprising:
receiving by the terminal a specific radio resource control (RRC) message, wherein the specific RRC message comprises an information element (IE) for state transition to RRC inactive state, wherein the IE for state transition to RRC inactive state comprises:
a first IE for positioning sounding reference signal (SRS) in RRC inactive state; or
a second IE for positioning sounding reference signal (SRS) in RRC inactive state;
performing by the terminal state transition to RRC inactive state;
performing by the terminal cell selection; and
performing by the terminal a first SRS transmission or a second SRS transmission,
wherein:
the first SRS transmission is performed in case that the first IE is comprised in the specific RRC message; and
the second SRS transmission is performed in case that the second IE is comprised in the specific RRC message, and
wherein:
the first SRS transmission is performed in a first specific cell, wherein the first specific cell is a cell where the specific RRC message is received; and
the second SRS transmission is performed in a second specific cell, wherein the second specific cell is a cell indicated in the second IE.

2. The method of claim 1, wherein:
the first IE comprises:
a field for bandwidth part; and
a field for positioning SRS configuration, and
the second IE comprises:
a field for positioning SRS area;
the field for bandwidth part; and
the field for positioning SRS configuration.

3. The method of claim 2, wherein:
a specific part of the first IE is applied to a single cell; and
the specific part of the second IE is applied to two or more cells.

4. The method of claim 3, wherein:
the single cell is the first specific cell; and
the two or more cells are indicated by the field for positioning SRS area.

5. The method of claim 3,
wherein the specific part is the field for positioning SRS configuration.

6. The method of claim 2, wherein:
the field for positioning SRS area comprises one or more first identifiers;
each of the one or more first identifiers consists of base station identity and cell identity.

7. The method of claim 6, wherein:
the first identifier of the second specific cell is comprised in the field for positioning SRS area.

8. The method of claim 2,
wherein the field for bandwidth part comprises a parameter for location and bandwidth.

9. The method of claim 8,
wherein the terminal determines a bandwidth part for the first SRS transmission based on:
the field for bandwidth part in the first IE; and
a specific field received in a system information.

10. The method of claim 9,
wherein the terminal determines a bandwidth part for the second SRS transmission based on:
the field for bandwidth part in the second IE; and
the specific field received in the system information.

11. The method of claim 10,
wherein the specific field indicates an offset in frequency domain between a lowest subcarrier of common radio bearer 0 and a lowest usable subcarrier in number of physical radio bearers.

12. A method by a terminal, the method comprising:
receiving by the terminal in a first cell a specific radio resource control (RRC) message, wherein the specific RRC message comprises an information element (IE) for positioning sounding reference signal (SRS) in RRC inactive state;
performing by the terminal state transition to RRC inactive state;
performing by the terminal cell selection to a second cell;
receiving by the terminal system information in the second cell;
determining by the terminal to perform a SRS transmission for positioning in the second cell; and
performing by the terminal the SRS transmission for positioning in the second cell based on the determination,
wherein the IE for positioning SRS in RRC inactive state comprises:
a field for positioning SRS area; and
a field for positioning SRS configuration,
wherein the field for positioning SRS area comprises one or more joint identifiers,
wherein each of the one or more joint identifiers comprises base station identifier and cell identifier,
wherein the field for positioning SRS configuration is commonly applied to two or more cells that are determined based on the field for positioning SRS area, and
wherein the terminal determines to perform SRS transmission for positioning in the second cell in case that a joint identifier indicated in the system information of the second cell is indicated in the field for positioning SRS area.

13. The method of claim 12,
wherein the terminal performs SRS transmission for positioning in a bandwidth part based on:
positioning SRS configuration that is comprised in the specific RRC message; and
a bandwidth parameter configuration that is comprised in the system information.

14. The method of claim 13,
wherein the positioning SRS configuration comprises:
one or more sets of parameters for positioning SRS resource set; and
one or more sets of parameters for positioning SRS resource.

15. The method of claim 14,
wherein each of the one or more sets of parameters for positioning SRS resource set comprise:
two or more positioning SRS resource identifiers;
a first offset for SRS power control;
a second offset for SRS power control;
a type of time domain behaviour of SRS resource; and
a pathloss reference field.

16. The method of claim 15,
wherein the pathloss reference field indicates synchronization signal block (SSB) configuration from neighbouring cell.

17. The method of claim 14,
wherein each of the one or more sets of parameters for positioning SRS resource comprise:
a parameter for periodicity of SRS resource;
a parameter for symbol location of SRS resource; and
a parameter jointly indicating SRS bandwidth and hopping bandwidth.

18. The method of claim 15,
wherein the SRS transmission for positioning is performed:
in one or more cells determined based on the field for positioning SRS area;
on two or more positioning SRS resource determined based on the one or more sets of parameters for positioning SRS resource; and
with transmission power determined based on a set of the one or more sets of parameters for positioning SRS resource set.

19. The method of claim 18,
wherein the transmission power for the SRS transmission for the positioning on the two or more positioning SRS resource is determined based on:
sum or the first offset for SRS power control and the second offset for SRS power control; and
the pathloss reference field.

20. A terminal comprising:
a transceiver,
a memory, and
a controller coupled to the transceiver and the memory, wherein the controller is configured to cause the terminal to:
receive a specific radio resource control (RRC) message, wherein the specific RRC message comprises an information element (IE) for state transition to RRC inactive state, wherein the IE for state transition to RRC inactive state comprises:
a first IE for positioning sounding reference signal (SRS) in RRC inactive state; or
a second IE for positioning sounding reference signal (SRS) in RRC inactive state;
perform state transition to RRC inactive state;
perform cell selection; and
perform a first SRS transmission or a second SRS transmission,
wherein:
the first SRS transmission is performed in case that the first IE is comprised in the specific RRC message; and
the second SRS transmission is performed in case that the second IE is comprised in the specific RRC message, and
wherein:
the first SRS transmission is performed in a first specific cell, wherein the first specific cell is a cell where the specific RRC message is received; and
the second SRS transmission is performed in a second specific cell, wherein the second specific cell is a cell indicated in the second IE.

* * * * *